Patented June 23, 1936

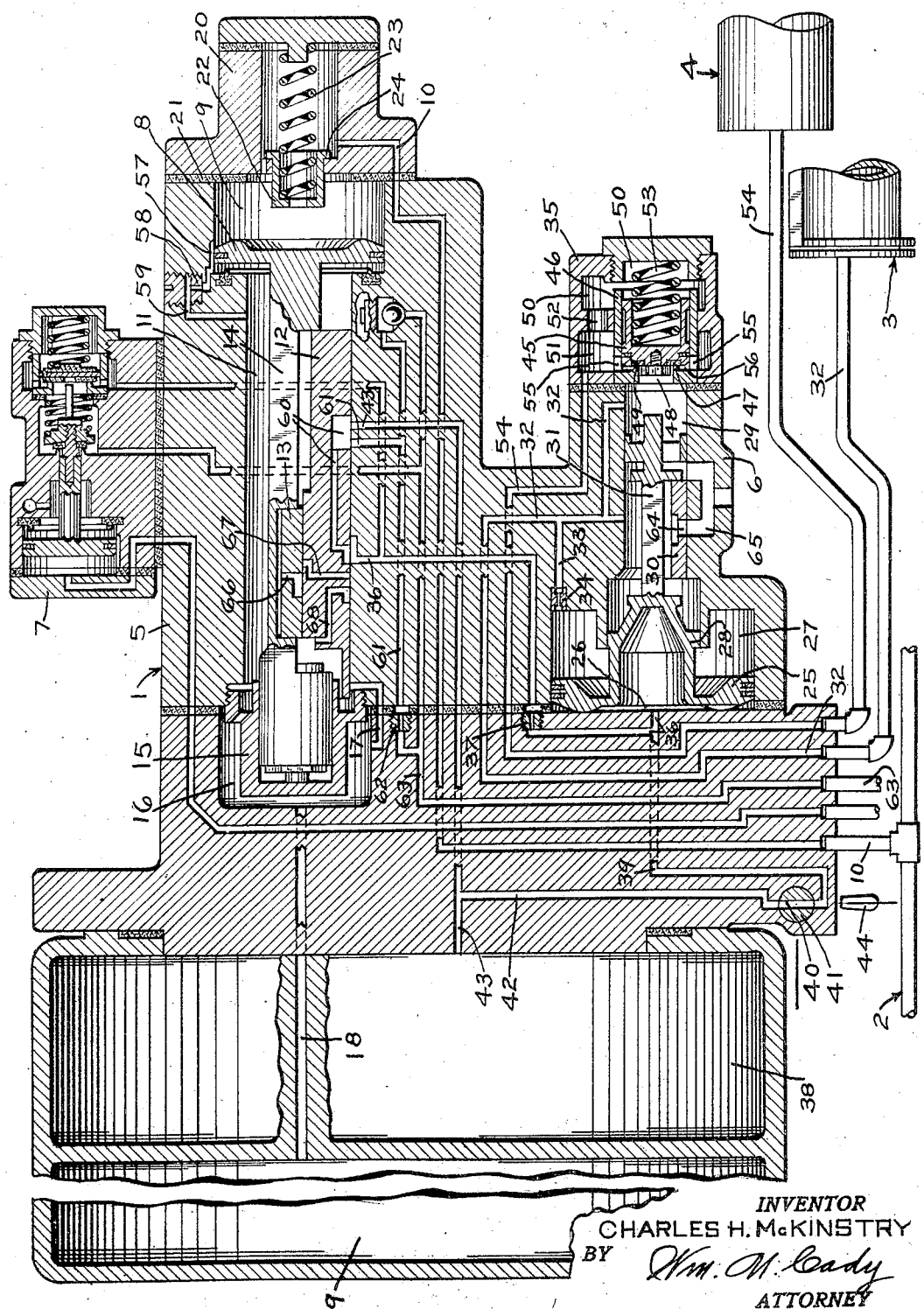

2,045,159

UNITED STATES PATENT OFFICE 2,045,159

LOCOMOTIVE BRAKE CONTROL

Charles H. McKinstry, Wilmerding, Pa., assignor to The Westinghouse Air Brake Company, Wilmerding, Pa., a corporation of Pennsylvania Application September 23, 1933, Serial No. 690,685

20 Claims. (Cl. 303—47)

This invention relates to fluid pressure brake equipments for locomotives and more particularly to a distributing valve device of the type covered in the patent of Clyde C. Farmer and Ellis E. Hewitt, No. 2,009,840.

The present standard fluid pressure brake equipment for the locomotive and cars of a train was designed for handling a train of a length up to around eighty cars. In recent years, however, trains of more than eighty cars have been operated on various railroads.

As a consequence of the increased length of trains, it has become increasingly difficult to properly control the application and release of the brakes and especially, to so control an emergency application of the train brakes as to insure the gentle gathering or closing of the slack in the train.

It is well known that when the engineer's automatic brake valve device is turned to emergency position, the brakes apply serially from the front of the train toward the rear of the train; that is to say, the locomotive brakes will apply first and then the brakes on the cars will apply serially toward the rear end of the train. As a result of this serial brake action, the deceleration of the locomotive begins before the brakes on the cars become effective.

There is a certain amount of slack or lost motion in the usual coupling mechanisms between the adjacent ends of adjacent cars of the train, and by reason of the fact, as above explained, that the locomotive begins to decelerate before the cars, this slack, if stretched out at the time an emergency application of the brakes is initiated, will run in against the slower moving locomotive, thus the locomotive will contribute to the harsh gathering or closing of the slack in the train.

It is highly desirable to avoid the above described action when an emergency application of the brakes is initiated, and to obtain this result, means have heretofore been proposed for holding back the application of the locomotive brakes for a period of time after a reduction in brake pipe pressure is initiated so that, during the period of time the slack in the train is gathering or closing, the inertia of the locomotive will tend to keep the slack stretched out.

I have found that, instead of holding back or delaying the application of the locomotive brakes, the above mentioned objectionable slack gathering action may be avoided when an emergency application of the locomotive brakes is initiated by retarding the rate of increase in the locomotive brake cylinder pressure to such an extent that it will not exceed the rate of increase on the cars of the train, and the principal object of my invention is to provide a locomotive brake equipment having means for retarding the rate of increase in brake cylinder pressure on the locomotive in effecting an emergency application of the brakes to avoid the above mentioned objectionable slack gathering action.

According to this object, I provide a choke plug in the application and release passage leading to the application piston chamber of the distributing valve device and also provide a communication from the application piston chamber to the application chamber, said choke plug controlling the rate of flow of fluid to both of said chambers in effecting an emergency application of the brakes, so as to retard the rate of increase in the locomotive brake cylinder pressure.

Another object of the invention is to provide means operative to selectively open or close the communication through which fluid under pressure flows from the application piston chamber to the application chamber.

Other objects and advantages will appear in the following more detailed description of the invention.

In the accompanying drawing, the single figure is a diagrammatic view mainly in section of a portion of a locomotive brake equipment including a distributing valve device embodying my invention.

The portion of the locomotive brake equipment shown in the drawing comprises a distributing valve device 1, a brake pipe 2, a brake cylinder 3 and a main reservoir 4. Although not shown, the equipment may also comprise the usual feed valve device and reducing valve device, a suitable automatic brake valve device and a suitable independent brake valve device. The brake valve devices may be substantially the same general type as those disclosed in the joint patent of Clyde C. Farmer and Ellis E. Hewitt, No. 2,009,840, or as those disclosed in the patent of Clyde C. Farmer, No. 1,975,264. When an automatic brake valve device of the type disclosed in the last mentioned patent is employed, the equipment will further comprise a combined equalizing discharge and maintaining valve device and a reduction limiting reservoir as disclosed in the patent.

The distributing valve device 1, with but a few exceptions hereinafter particularly pointed out, is substantially the same in construction and functions in substantially the same manner as the distributing valve device shown and described in the above mentioned Farmer and Hewitt patent, No. 2,009,840. In view of this a simplified form of distributing valve device is shown in the drawing which includes only those parts which are necessary to a clear understanding of my invention.

The distributing valve device shown in the drawing comprises an equalizing portion 5, an application portion 6 and a release valve device 7.

The equalizing portion 5 comprises a piston 8 having at one side a piston chamber 9 connected through a passage and pipe 10 with the brake pipe 2, and having at the other side a chamber 11 containing a main slide valve 12 and an auxiliary slide valve 13 adapted to be operated by the piston 8 through the medium of a stem 14.

One end of the valve chamber 11 is defined by a cap member 15 having screw-threaded connection with the casing, said cap member together with the casing defining a chamber 16 which is in constant open communication by way of a passage 18 with a pressure chamber or reservoir 19.

The outer end of the piston chamber 9 is closed by a cap member 20, a gasket 21 being clamped between the member and casing to prevent leakage of fluid under pressure from the chamber to the atmosphere. A portion of this gasket extends into the piston chamber, against which portion the piston 8 is adapted to seal when the piston is moved to emergency position.

Slidably mounted in the cap member 20 is an equalizing piston stop 22 which is subject to the pressure of a spring 23, inward movement of the stop, by the action of the spring, being limited by the engagement of a flange 24 thereon with the cap member as shown in the drawing.

The application portion 6 of the distributing valve device comprises an application piston 25 having at one side an application piston chamber 26 and at the other side a chamber 27. The application piston is provided with a baffle piston 28 which is slidably mounted in a suitable bore in the casing and disposed between the chamber 27 and a valve chamber 29 containing a brake cylinder exhaust valve 30 which is adapted to be operated by means of the stem 31 of the application piston, said chamber 29 being in constant open communication through a passage and pipe 32 with the brake cylinder 3 and also with the chamber 27 through passage 32, a branch passage 33 and the passage in a choke plug 34 having screw-threaded connection with the casing.

The application piston stem 31, besides being adapted to operate the brake cylinder exhaust valve 30, is also adapted to control the operation of a supply valve device 35 which is secured to the casing of the application portion.

The application piston chamber is in constant open communication with an application and release passage 36 which leads to the seat of the main slide valve 12. According to my invention, a choke plug 37 is interposed in the passage 36 and a communication is provided between the application piston chamber 26 and an application chamber 38 by way of a passage 39, the passage 40 in a plug valve 41, rotatably mounted in the casing, a passage 42 and a passage 43, which passage 43 leads from the seat of the main slide valve to the application chamber 38. For long train operation the plug valve will be turned, by means of the handle 44, to its open position in which it is shown in the drawing, and for short train operation, will be moved to its closed position, in which it closes communication from the application piston chamber 26 to the application chamber 38, all of which will be hereinafter more fully described. It will here be understood that the only material differences in the construction of the distributing valve of this application and that of the distributing valve device disclosed in the aforementioned Patent No. 2,009,840 reside in the addition of the choke plug 37, passage 39, the plug valve 41 and the passage 42.

The supply valve device 35 may comprise a valve piston 45 which is slidably mounted in a bushing 46 secured in the casing of the device. The bushing is provided with a seat rib 47 which surrounds a passage 48 leading to the valve chamber 29 and against which a gasket 49, mounted in the end of the valve piston, is adapted to seat. The casing of the device together with the bushing 46 define chambers 50 and 51 which are in constant open communication with each other through a passage 52 in the casing. Contained in the chamber 50 is a spring 53 which is adapted to urge the valve piston into sealing engagement with the seat rib 47. The chamber 51 is in constant open communication through a passage and pipe 54 with the main reservoir 4 and is also in constant open communication through ports 55 in the bushing 46 with a chamber 56 at the seating side of the valve piston and surrounding the seat rib 47.

The release valve device 7 is provided for the purpose of controlling the release of the locomotive brakes independently of the operation of the equalizing portion of the distributing valve device and since the details of construction as well as its functions have been fully covered in the hereinbefore mentioned Patent No. 2,009,840, a detailed description of the same in the present application is deemed unnecessary.

*Initial charging*

In charging the equipment, fluid under pressure supplied to the brake pipe 2 in the usual manner, flows therefrom through pipe and passage 10 to the equalizing piston chamber 9, and with the equalizing piston 8 in release position, as shown in the drawing, flows from thence through a feed groove 57 around the piston, the opening in a choke plug 58 and a passage 59 to the equalizing valve chamber 11. From the chamber 11 fluid under pressure flows through passage 17, chamber 16, and passage 18 to the pressure chamber 19. It will thus be seen that the equalizing valve chamber 11 and pressure chamber 18 are charged with fluid to the pressure carried in the brake pipe.

With the equalizing slide valves 12 and 13 in release position, the application piston chamber 26 is open to the atmosphere by way of passage 36, a cavity 60 in the main slide valve 12, a passage 61, the opening in a choke plug 62 interposed in the passage 61, a passage and pipe 63 and suitable connections from the pipe 63 by way of the brake valve devices.

Further, with the equalizing slide valves 12 and 13 in release position, the application chamber 38 is open to the atmosphere by way of passage 43, cavity 60 and the connections just traced leading from the cavity to the atmosphere.

With the plug valve 41 open as shown in the drawing, the application piston chamber 26 is also open to the atmosphere by way of passages 36 and 39, passage 40 in the plug valve 41, passage 42 and passage 43 open to the atmosphere. With the plug valve in its closed position the only communication from the application piston chamber to the atmosphere is by way of the passage 36 and choke plug 37.

With the application piston 25 and brake cylinder release valve 30 in release position, as shown in the drawing, the brake cylinder 3 is open to the atmosphere by way of pipe and passage 32, valve chamber 29, a port 64 in valve 30 and an atmospheric passage 65.

*Service application*

When it is desired to effect a service application of the brakes on a train, the automatic brake valve device is turned to service position, in which fluid under pressure is vented, at a service rate, from the brake pipe 2 and consequently from the equalizing piston chamber 9. Upon a reduction in the pressure of fluid in the piston chamber, resulting from such venting, the pressure of fluid in the equalizing valve chamber 11 causes the equalizing piston 8 to move outwardly to service position, in which position the piston comes to a stop against the spring stop 22.

The equalizing piston 8, in its traverse to service position, first closes communication between the piston chamber 9 and valve chamber 11 by way of the feed groove 57 and shifts the auxiliary slide valve 13 relative to the main slide valve 12, so as to bring a port 66 in the slide valve 13 into open communication with a service port 67 in the main slide valve 12, said port 66 being in open communication with the valve chamber 11. The piston as it continues to move outwardly now moves the auxiliary and main slide valves 13 and 12, respectively, in unison. The main slide valve as it is thus moved, first laps the release passage 61 and then brings the port 67 into open communication with the application and release passage 36. Fluid under pressure now flows from the valve chamber 11 and connected pressure chamber 19 to the application piston chamber 26 by way of the ports 66 and 67, passage 36 and opening in the choke plug 37.

With the main slide valve 12 in service position, the cavity 60 still establishes communication between the passages 36 and 43, so that fluid under pressure supplied through the passages 66 and 67 to the passage 36, also flows, by way of said cavity and passage 43 to the application chamber 38.

With the plug valve 41 in its open position, as shown in the drawing, fluid under pressure may also flow to the application piston chamber 26 by way of passages 43 and 42, passage 40 in the plug valve 41 and passage 39. With the plug valve 41 in its closed position, the communication from the passage 42 to the application piston chamber 26 is disestablished and the flow of fluid to the chamber is by way of the passage 36 and the opening in the choke plug 37.

Fluid under pressure supplied to the application piston chamber 26 causes the application piston 25 to move inwardly i. e., in a direction toward the right hand, said piston, through the medium of the piston stem 14, shifting the brake cylinder exhaust valve 30 to close the communication from the valve chamber 29 and connected brake cylinder 3 to the atmospheric passage 65.

As the piston continues to move in this direction, the end of the piston stem 31 engages and moves the valve piston 45 out of seating engagement with the seat rib 47 against the resistance of the spring 53 and the pressure of fluid in chamber 50. Fluid at main reservoir pressure now flows through the connected chambers 51 and 56, past the valve piston and through passage 48 to the valve chamber 29, and from thence flows through passage and pipe 32 to the brake cylinder 3.

From the passage 32, fluid under pressure also flows through passage 33 and the opening in the choke plug 34 to the chamber 27 at the back of the application piston 25.

When with the valve piston thus unseated, the rate of increase in brake cylinder pressure substantially equals the rate of increase in the pressure of fluid in the application piston chamber 26, the application piston 25 will come to a stop, and the flow of fluid to the brake cylinder at a rate corresponding to the rate of increase in the application piston chamber will continue as long as the increase in application piston chamber pressure continues.

When, in effecting a limited application of the brakes, the pressure of fluid in the equalizing valve chamber 11 is reduced, by the flow of fluid therefrom to the application piston chamber 26 and application chamber 38, to a point slightly below the brake pipe pressure in the equalizing piston chamber 9, the equalizing piston will be caused to move inwardly, shifting the auxiliary slide valve 13 relative to the main slide valve 12, to close the communication from the port 66 to the port 67, thus closing off the further flow of fluid from the equalizing valve chamber 11 to the application piston chamber 26 and application chamber 38. With this communication closed, the pressures on opposite sides of the equalizing piston will be substantially equal, and due to this, the piston will come to a stop without moving the main slide valve out of its service position.

When, with the flow of fluid to the application piston chamber 26 and application chamber 38 thus closed off, the pressures of fluid on opposite sides of the application piston are substantially equal, the valve piston 45 will, under the influence of the pressure of the spring 53 and the pressure of fluid in chamber 50, be moved into seating engagement with the seat rib 47, the valve piston as it is thus moved, shifting the application piston forwardly to lap position in which the brake cylinder exhaust valve 30 still maintains the communication closed from the brake cylinder to the atmospheric passage 65.

*Release of brakes after a service application*

When it is desired to release the brakes, the brake pipe pressure is increased in the usual manner, and since this increase is also effective in the equalizing piston chamber 9, the equalizing piston 8 and thereby the slide valves 12 and 13 are caused to move to release position, in which fluid under pressure is vented from the application piston chamber 26 to the atmosphere by way of passage 36, cavity 60 in the equalizing main slide valve, passage 61, choke plug 62 and passage and pipe 63, which pipe 63 is adapted to be open to the atmosphere through suitable communications in the brake valve devices. Fluid under pressure is also vented from the application chamber 38 by way of passage 43, cavity 60 in the main slide valve 12 and the connections leading therefrom to the atmosphere.

With the application piston chamber 26 thus open to the atmosphere, fluid under pressure in the chambers 27 and 29, cause the application piston and thereby the brake cylinder exhaust valve 30 to move to release position, as shown in the drawing, and in which fluid under pressure is vented from the brake cylinder to the atmosphere by way of pipe and passage 32, valve chamber 29, port 64 in the slide valve 30 and passage 65.

The several parts of the equalizing valve device being now in release position, the charging of the equipment will be the same as described in connection with the initial charging.

*Emergency application of the brakes*

When the brake pipe pressure is suddenly reduced at an emergency rate, the equalizing piston 8 moves out to emergency position overcoming the resistance of the spring stop 22 and engaging the gasket 21. The piston, as it is thus moved, shifts the slide valves 12 and 13 to emergency position, in which the cavity 60 no longer establishes communication from the passage 36, connected with the application piston chamber 26, to the passage 43 leading to the application chamber 38, and in which an emergency port 68 connects the equalizing valve chamber 11 with the passage 36.

Fluid under pressure now flows from the equalizing valve chamber 11 and connected pressure chamber 19 to the application piston chamber 26 by way of port 68, passage 36 and the opening in the choke plug 37. From the passage 36, on the application piston side of the choke plug 37, fluid under pressure flows, by way of passage 39, passage 40 in the plug valve 41, passage 42 and passage 43, to the application chamber 38, the rate of the flow of fluid to the application piston chamber 26 and application chamber being restricted by the choke plug 37.

Due to the flow of fluid to the application chamber 38 and to the restricted flow of fluid to this chamber and to the application piston chamber 26, the increase in the pressure of fluid in the application piston chamber 26 will be at a slower rate than would be the case if the choke plug 37 and the connections from the application piston chamber to the application chamber 38 were omitted.

Fluid under pressure supplied to the application piston chamber 26 causes the application piston 25 and thereby the brake cylinder exhaust valve 30 to move in the same manner as in effecting a service application of the brakes, the piston stem engaging and moving the valve piston 45 away from the seat rib 47, permitting fluid at main reservoir pressure to flow to the brake cylinder 3. With fluid under pressure thus being supplied to the brake cylinder, the application piston functions in the same manner as in effecting a service application of the brakes to control the operation of the valve piston 45 to regulate the rate of increase in brake cylinder pressure according to the rate of increase in the pressure of fluid in the application piston chamber 26. It will here be noted that since, in effecting an emergency application of the brakes, the rate of increase in the application piston chamber pressure is retarded over what would be the case with the choke plug 37 and the connections from the application piston chamber to the application chamber omitted, the rate of increase in brake cylinder pressure is correspondingly retarded.

Due to this, the braking power of the locomotive brakes, in effecting an emergency application of the brakes, will be increased in such a gradual manner as to materially contribute to the gentle gathering of slack in the train.

On a short train such as is employed in passenger service where the slack in the train is not sufficient to cause harsh damaging shocks, the plug valve 41 may be moved to closed position, in which the increase in the pressure of fluid in the application piston chamber 26 and consequently in the brake cylinder 3 will be at a faster rate than when the application chamber 38 is in communication with the piston chamber 26.

*Release of the brakes after an emergency application*

When it is desired to release the brakes after an emergency application, the brake pipe pressure is increased in the usual manner, which causes the several parts of the distributing valve device to move to release position in the same manner as hereinbefore described in connection with the release of the brakes after a service application.

The requirements as to the rate of increase in brake cylinder pressure on the cars of a train, in effecting an emergency application of the brakes, differs on various railroads and to adapt the equalizing valve device to properly retard the rate of increase in locomotive brake cylinder pressure under any of these different requirements, a choke 37 having an opening of the proper flow area is used.

It will be understood that instead of interposing the choke plug 37 in the passage 36, it may be interposed in the emergency port 68 of the main slide valve 12.

The volume of the application piston chamber 26 is very small, and due to this, the restriction offered by the choke 37 to the flow of fluid to this chamber when the plug valve 41 is in its closed position for short train operation, will not materially affect the normal operation of the application portion to regulate the supply of fluid to the locomotive brake cylinder, in other words with the plug valve in its closed position, the operation of the application portion will be substantially the same whether or not the choke plug is interposed in the passage 36.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, of a plurality of chambers in open communication with each other, valve means subject on one side to the pressure of fluid in said chambers and operative upon an increase in the pressure of fluid in said chambers for effecting an application of the brakes, a valve device operative upon a reduction in brake pipe pressure at a service rate for supplying fluid under pressure to the chambers through two communications and operative upon a reduction in brake pipe pressure at an emergency rate for supplying fluid under pressure to the chambers through a single communication, and means for restricting the flow of fluid through the last mentioned communication.

2. In a fluid pressure brake, the combination with a brake pipe, of a plurality of chambers in open communication with each other, valve means subject on one side to the pressure of fluid in said chambers and operative upon an increase in the pressure of fluid in said chambers for effecting an application of the brakes, a valve device operative upon a reduction in brake pipe pressure at a service rate for supplying fluid under pressure to the chambers through two communications and operative upon a reduction in brake pipe pressure at an emergency rate for closing one of said communications and for supplying fluid under pressure through the other of said communications to said chambers, and means for restricting the flow of fluid through said other communication.

3. In a fluid pressure brake, the combination with a brake pipe, of a plurality of chambers in open communication with each other, valve means subject on one side to the pressure of fluid in said chambers and operative upon an increase in the pressure of fluid in said chambers for effecting an application of the brakes, a valve device operative upon a reduction in brake pipe pressure at a service rate for supplying fluid under pressure to the chambers through two communications and operative upon a reduction in brake pipe pressure at an emergency rate for supplying fluid under pressure to the chambers through a single communication, and means operative to close the communication between said chambers.

4. In a fluid pressure brake, the combination with a brake pipe, of a plurality of chambers in open communication with each other, valve means subject on one side to the pressure of fluid in said chambers and operative upon an increase in the pressure of fluid in said chambers for effecting an application of the brakes, a valve device operative upon a reduction in brake pipe pressure at a service rate for supplying fluid under pressure to the chambers through two communications and operative upon a reduction in brake pipe pressure at an emergency rate for supplying fluid under pressure to the chambers through a single communication, and a valve operative manually to close the communication between said chambers.

5. In a fluid pressure brake, the combination with a brake pipe, of a distributing valve device having an application chamber, an application piston chamber and a passage connecting said chambers, valve means operative to effect an application of the brakes, an application piston in said application piston chamber operative upon an increase in the pressure of fluid in said chambers for actuating said valve means, valve mechanism operative upon a reduction in brake pipe pressure at an emergency rate to an emergency position to supply fluid under pressure to said chambers, and means for restricting the flow of fluid to said chambers, the flow restricting means and the volume of the application chamber being such that the rate of increase in application piston chamber pressure is less than the usual emergency rate.

6. In a fluid pressure brake, the combination with a brake pipe, of a distributing valve device having an application chamber and an application piston chamber, valve means operative to effect an application of the brakes, an application piston in said application piston chamber operative upon an increase in the pressure of fluid in the piston chamber for actuating said valve means, valve mechanism operative upon a reduction in brake pipe pressure at an emergency rate to emergency position for supplying fluid under pressure to the application piston chamber, a passage through which fluid under pressure flows from the application piston chamber to the application chamber, a cut off valve device operative to close communication through said passage from the application piston chamber to the application chamber, and means for actuating said cut off valve device.

7. In a fluid pressure brake, the combination with a brake pipe, of a distributing valve device having an application chamber and an application piston chamber, valve means operative to effect an application of the brakes, an application piston in said application piston chamber operative upon an increase in the pressure of fluid in the piston chamber for actuating said valve means, valve mechanism operative upon a reduction in brake pipe pressure at an emergency rate to emergency position for supplying fluid under pressure to the application piston chamber, a passage through which fluid under pressure flows from the application piston chamber to the application chamber, and means for restricting the flow of fluid to said application piston chamber, said means and application chamber being adapted to insure the increase in application piston chamber pressure being at a rate less than the usual emergency rate.

8. In a fluid pressure brake, the combination with a brake pipe, of a brake controlling valve device comprising valve means operative upon an increase in the pressure of fluid on one side thereof to effect an application of the brakes and valve mechanism operative upon a reduction in brake pipe pressure at an emergency rate to emergency position to increase the pressure of fluid on said side of said valve means when said valve mechanism is in emergency position, of means operative to retard the rate of increase in the pressure of fluid on said side of said valve means, and a valve operative to render said means ineffective to retard the rate of increase in the pressure of fluid on said side of said valve means.

9. In a fluid pressure brake, the combination with a brake pipe, of a brake controlling valve device comprising valve means operative upon an increase in the pressure of fluid on one side thereof to effect an application of the brakes and valve mechanism operative upon a reduction in brake pipe pressure at an emergency rate to emergency position to increase the pressure of fluid on said side of said valve means, of means operative to retard the rate of increase in the pressure of fluid on said side of said valve means when the valve mechanism is in emergency position, and a valve operative manually to render said means ineffective to retard the rate of increase in the pressure of fluid on said side of said valve means.

10. In a fluid pressure brake, the combination with a brake pipe, of a brake controlling valve device comprising valve means operative upon an increase in the pressure of fluid on one side thereof to effect an application of the brakes and valve mechanism operative to emergency position upon a reduction in brake pipe pressure at an emergency rate to increase the pressure of fluid on said side of said valve means, of means operative when the valve mechanism is in emergency position to retard the increase in the pressure of fluid on said side of the valve means to a rate less than the usual emergency rate.

11. In a fluid pressure brake, the combination with a brake pipe and a brake cylinder, of an application valve device comprising a valve for controlling the supply of fluid under pressure to the brake cylinder, a piston operated by fluid under pressure for actuating said valve, an equalizing valve device comprising valve means for controlling the supply of fluid under pressure to said piston, a movable abutment operated upon a reduction in brake pipe pressure for actuating said valve means, an application chamber having a passage which is connected in the service application position of said valve means with said piston through a passage having a restricted flow area, and a passageway directly connecting said piston with said application chamber.

12. In a fluid pressure brake, the combination with a brake pipe and a brake cylinder, of an application valve device comprising a valve for controlling the supply of fluid under pressure to the brake cylinder, a piston operated by fluid under pressure for actuating said valve, an equalizing valve device comprising valve means for controlling the supply of fluid under pressure to said piston, a movable abutment operated upon a reduction in brake pipe pressure for actuating said valve means, an application chamber having a passage which is connected in the service application position of said valve means with said piston through a passage having a restricted flow area, a passageway directly connecting said piston with said application chamber, and a manually operated valve for controlling communication through said passageway.

13. In a fluid pressure brake, the combination with a brake pipe and a brake cylinder, of an application valve device comprising a valve for controlling the supply of fluid under pressure to the brake cylinder, a piston operated by fluid under pressure for actuating said valve, an equalizing valve device comprising valve means for controlling the supply of fluid under pressure to said piston, a movable abutment operated upon a reduction in brake pipe pressure for actuating said valve means, an application chamber having a passage which is connected in the service application position of said valve means with said piston through another passage, and a passageway directly connecting said piston with said application chamber, said movable abutment being operated upon an emergency reduction in brake pipe pressure for actuating said valve means to supply fluid under pressure through the last mentioned passage to actuate said piston, and means for restricting the flow of fluid through the last mentioned passage.

14. In a fluid pressure brake, the combination with a brake pipe and brake cylinder, of an application valve device operated by an increase in fluid pressure for supplying fluid under pressure to the brake cylinder, an equalizing valve device comprising a movable abutment subject to brake pipe pressure and valve means operated by said abutment upon a service reduction in brake pipe pressure for supplying fluid under pressure to said application valve device through a passage having a restricted flow area and movable by said abutment upon an emergency reduction in brake pipe pressure to supply fluid under pressure through said passage to said application valve device, and an application chamber having a passage which is connected through said valve means with said restricted passage in service position and which is cut off by said valve means in emergency position, and a passageway directly connecting said application chamber with said application valve device, through which fluid under pressure, supplied in emergency position to said application valve device, is supplied to said application chamber.

15. In a fluid pressure brake, the combination with a brake pipe, of a brake controlling valve device having an application chamber and an application piston chamber, valve means operative to effect an application of the brakes, an application piston in said application piston chamber operative upon an increase in the pressure of fluid in the piston chamber for actuating said valve means, valve mechanism operative upon a reduction in brake pipe pressure at an emergency rate to emergency position for establishing communication through which fluid under pressure is supplied to the application piston chamber and to the application chamber, and a choke interposed in said communication having a flow area so proportioned with relation to the application chamber as to retard the rate of increase in the pressures of fluid in said application piston chamber, to a rate less than the usual emergency rate.

16. In a fluid pressure brake, the combination with a brake pipe, of a brake controlling valve device having an application chamber and an application piston chamber, valve means operative to effect an application of the brakes, an application piston in said application piston chamber operative upon an increase in the pressure of fluid in the piston chamber for actuating said valve means, valve mechanism operative upon a reduction in brake pipe pressure at an emergency rate to emergency position for establishing communication through which fluid under pressure is supplied to the application piston chamber and to the application chamber, and a choke interposed in said communication at a point between said valve mechanism and said chambers for retarding the rate of increase in the pressures of fluid in said chambers.

17. In a fluid pressure brake, the combination with a brake pipe, of a brake controlling valve device having an application chamber and an application piston chamber, valve means operative to effect an application of the brakes, an application piston in said application piston chamber operative upon an increase in the pressure of fluid in the piston chamber for actuating said valve means, valve mechanism operative upon a reduction in brake pipe pressure at an emergency rate to emergency position for establishing communication through which fluid under pressure is supplied to the application piston chamber and to the application chamber, a choke interposed in said communication for retarding the rate of increase in the pressures of fluid in said chambers, and a valve device interposed in said communication operative to one position to close the communication to the application chamber.

18. In a fluid pressure brake, the combination with a brake pipe, of a brake controlling valve device having an application chamber and an application piston chamber, valve means operative to effect an application of the brakes, an application piston in said application piston chamber operative upon an increase in the pressure of fluid in the piston chamber for actuating said valve means, valve mechanism operative upon a reduction in brake pipe pressure at an emergency rate to emergency position for establishing communication through which fluid under pressure is supplied to the application piston chamber and to the application chamber, a choke interposed in said communication for retarding the rate of increase in the pressures of fluid in said chambers, and a valve device interposed in said communication at a point between the application chamber and the application piston chamber operative to close the communication to the application chamber.

19. In a fluid pressure brake, the combination with a brake pipe, of a plurality of chambers in open communication with each other, valve means subject on one side to the pressures of fluid in said chambers and operative upon an increase in the pressure of fluid in said chambers for effecting an application of the brakes, a communication through which fluid under pressure is adapted to flow to said chambers at a certain rate in effecting a service application of the brakes, a communication through which fluid under pressure is adapted to flow to said chambers at a slower rate in effecting an emergency application of the brakes, and means operative upon a reduction in brake pipe pressure in effecting a service application of the brakes to supply fluid under pressure to the first mentioned communication and operative upon a reduction in brake pipe pressure in effecting an emergency application of the brakes to supply fluid under pressure to the second mentioned communication only.

20. In a fluid pressure brake, the combination with a brake pipe, of a plurality of chambers in open communication with each other, valve means subject on one side to the pressure of fluid in said chambers and operative upon an increase in the pressure of fluid in said chambers for effecting an application of the brakes, a communication through which fluid under pressure is adapted to flow to said chambers at a certain rate in effecting a service application of the brakes, a communication through which fluid under pressure is adapted to flow to said chambers at a slower rate in effecting an emergency application of the brakes, means operative upon a reduction in brake pipe pressure in effecting a service application of the brakes to supply fluid under pressure to the first mentioned communication and operative upon a reduction in brake pipe pressure in effecting an emergency application of the brakes to supply fluid under pressure to the second mentioned communication only, and a valve device operative to close communication between said chambers.

CHARLES H. McKINSTRY.